US011408780B2

(12) United States Patent
Simpson et al.

(10) Patent No.: US 11,408,780 B2
(45) Date of Patent: Aug. 9, 2022

(54) THERMAL SENSOR AND METHOD OF MANUFACTURE

(71) Applicant: Kidde Technologies, Inc., Wilson, NC (US)

(72) Inventors: Terry Simpson, Wake Forest, NC (US); Daniel James Galway, Wilson, NC (US)

(73) Assignee: KIDDE TECHNOLOGIES, INC., Wilson, NC (US)

( * ) Notice: Subject to any disclaimer, the term of this patent is extended or adjusted under 35 U.S.C. 154(b) by 341 days.

(21) Appl. No.: 16/543,001

(22) Filed: Aug. 16, 2019

(65) Prior Publication Data

US 2021/0048352 A1 Feb. 18, 2021

(51) Int. Cl.
*G01K 11/00* (2006.01)
*G01K 11/06* (2006.01)

(52) U.S. Cl.
CPC .................. *G01K 11/06* (2013.01)

(58) Field of Classification Search
CPC combination set(s) only.
See application file for complete search history.

(56) References Cited

U.S. PATENT DOCUMENTS

| 4,365,229 | A  | 12/1982 | Tokarz |
|---|---|---|---|
| 7,365,631 | B2 | 4/2008 | Chaumeau et al. |
| 9,518,872 | B2 | 12/2016 | Rogers et al. |
| 9,933,316 | B2 | 4/2018 | Ding et al. |
| 9,976,925 | B2 | 5/2018 | Rogers |
| 10,101,218 | B2 | 10/2018 | Ding et al. |
| 2015/0369672 | A1* | 12/2015 | Ding ...................... G01K 13/00 374/185 |
| 2015/0369673 | A1* | 12/2015 | Ding ...................... G01K 7/16 374/185 |
| 2016/0103022 | A1* | 4/2016 | Rogers ..................... B05D 1/18 374/163 |

FOREIGN PATENT DOCUMENTS

| EP | 1777503 A1 | 4/2007 | |
|---|---|---|---|
| EP | 1990020 A2 | 11/2008 | |
| EP | 2957877 A1 | 12/2015 | |
| EP | 2957878 A1 | 12/2015 | |
| EP | 3009818 A1 | 4/2016 | |
| EP | 3220114 A1 | 9/2017 | |
| WO | WO-2008044458 A1 * | 4/2008 | ............ G01K 11/06 |
| WO | WO-2010014730 A1 * | 2/2010 | ............ G01K 3/04 |
| WO | WO-2018005529 A1 * | 1/2018 | ............ G01K 11/06 |

OTHER PUBLICATIONS

Extended European Search Report issued in Application No. 19212802.3 dated Jul. 20, 2020, 6 pages.
EPO Official Letter for Application No. 19212802.3, dated Mar. 10, 2022, 4 pages.

* cited by examiner

*Primary Examiner* — Lisa M Caputo
*Assistant Examiner* — Nasir U. Ahmed
(74) *Attorney, Agent, or Firm* — Cantor Colburn LLP

(57) ABSTRACT

A thermal sensor and a method of making a thermal sensor is disclosed. The thermal sensor includes a first electrode, a second electrode, and a composition between the first and second electrodes. The composition includes solid particles of a state-changing material that transitions at a threshold temperature between solid and liquid states having different electrical conductivities.

5 Claims, 3 Drawing Sheets

THERMAL SENSOR AND METHOD OF MANUFACTURE

BACKGROUND

The subject matter disclosed herein generally relates to components and systems for thermal detection, and more particularly to detecting high temperature conditions such as may result from hot fluid leaks from a duct or conduit.

It is recognized that hot fluid from a duct leak can cause loss of fluid supplied to systems that utilize such fluid and can also cause damage to surrounding structures and components. Various systems involve the transport of hot fluids, including but not limited to on-board aircraft systems such as environmental control systems (ECS) or on-board inert gas generating systems (OBIGGS) that utilize hot bleed air. Thermal sensors can be used to detect leaks of hot fluids, known as a duct leak overheat detection system (DLODS) for aircraft applications. Such systems can utilize thermal sensors with accurate temperature alarm setting along the length of these sensors to provide leak detection capabilities.

BRIEF DESCRIPTION

A thermal sensor is disclosed, including a first electrode, a second electrode, and a composition between the first and second electrodes. The composition comprises solid particles that comprise a state-changing material that transitions at a threshold temperature between solid and liquid states having different electrical conductivities.

A method of making a thermal sensor is also disclosed. According to the method, first and second electrodes are provided, and a composition is disposed between the first and second electrodes. The composition comprises solid particles that comprise a state-changing material that transitions at a threshold temperature between solid and liquid states having different electrical conductivities.

In any of the above aspects, the composition between the first and second electrodes can further include a binder.

In any of the above aspects, the binder can be present in an amount less than or equal to an amount at which the particles form an electrically-conductive path between the first and second electrodes in the liquid state.

In any one or combination of the above aspects, the binder can be selected from a grease, a polymer, a glue, a wax, a cement, or a ceramic.

In any one or combination of the above aspects, the binder can include a grease that comprises an oil and filler particles comprising a salt of a fatty acid.

In any one or combination of the above aspects, a plurality of electrically non-conductive beads can be disposed between the first and second electrodes.

In any one or combination of the above aspects, the first and second electrodes can be arranged as coaxially-extending inner and electrodes.

In any one or combination of the above aspects, a plurality of electrically non-conductive beads can be disposed between coaxially-extending inner and outer electrodes.

In any one or combination of the above aspects, the thermal sensor can be on an aircraft comprising an aircraft body, an engine, a bleed air conduit extending from a compressor section of the engine, with the thermal sensor extending along the bleed air conduit.

In any one or combination of the above aspects, the composition can be applied to the first electrode, and the second electrode disposed adjacent to the composition.

In any one or combination of the above aspects, a vacuum can be applied to the composition.

In any one or combination of the above aspects, the first and second electrodes are arranged as coaxially-extending inner and outer electrodes, a plurality of electrically non-conductive beads are disposed on the inner electrode, and the composition is applied to the inner electrode in spaces between the electrically non-conductive beads.

Also disclosed is a further method of making a thermal sensor. According to the method, a plurality of electrically non-conductive beads are disposed along a first axially-extending electrode, arranged with gaps between the electrically non-conductive beads. A composition comprising a state-changing material that transitions at a threshold temperature between solid and liquid states having different electrical conductivities is applied to the first axially-extending electrode in the gaps between the electrically non-conductive beads, and a coaxially-extending second electrode is disposed around the first axially-extending electrode.

In any one or combination of the above aspects, the state-changing material can comprise a eutectic salt mixture.

In any one or combination of the above aspects, the solid particles can individually comprise a eutectic salt mixture.

In any one or combination of the above aspects, the composition can comprise a plurality of solid particles of different salts in amounts to form a eutectic mixture.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more aspects of the disclosed apparatus and method are presented herein by way of exemplification and not limitation with reference to the Figures.

Although shown and described above and below with respect to an aircraft, aspects of the present disclosure are applicable to on-board systems for any type of vehicle or for on-site installation in fixed systems. For example, military vehicles, heavy machinery vehicles, sea craft, ships, submarines, as well as stationary applications such as those involving transport of high-temperature fluids where a thermal sensor can detect escape of the high-temperature fluid, may benefit from implementation of aspects of the present disclosure. As such, the present disclosure is not limited to application to aircraft, but rather aircraft are illustrated and described as example and explanatory aspects for implementation of aspects of the present disclosure.

Figure 1A:
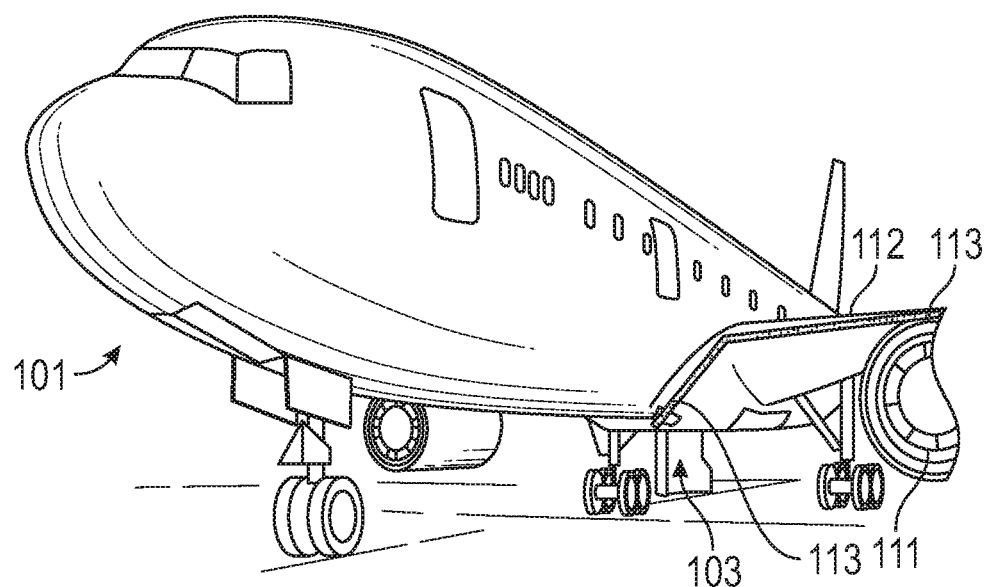
FIG. 1A is a schematic illustration of an aircraft that can incorporate various aspects of the present disclosure.
Figure 1B:
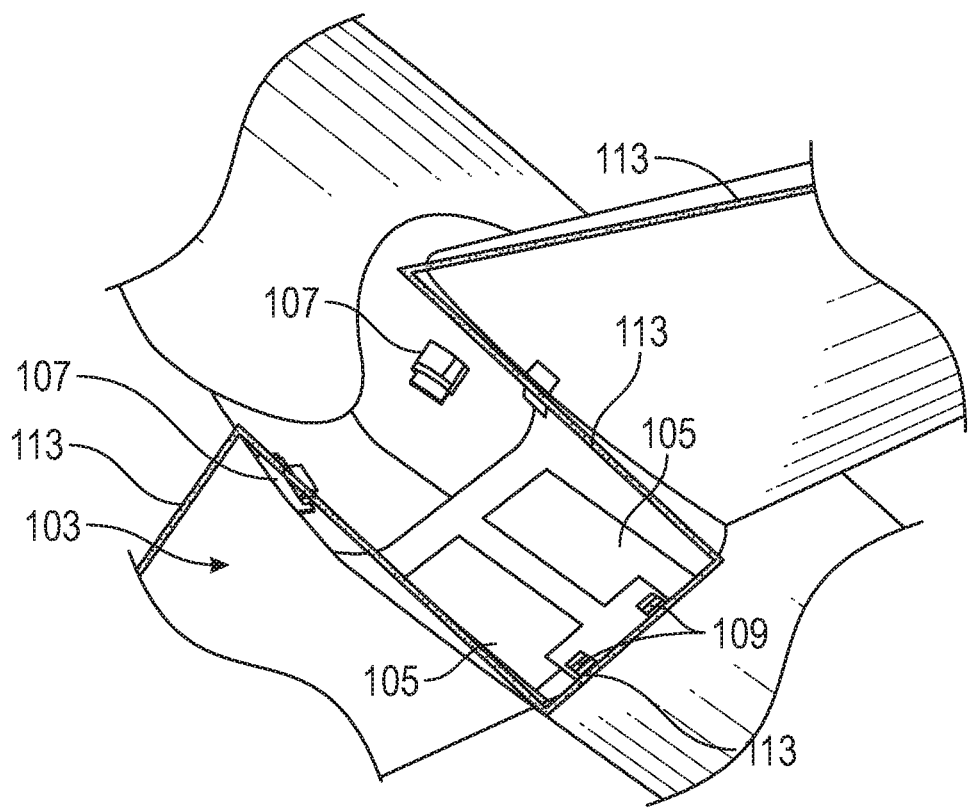
FIG. 1B is a schematic illustration of a bay section of the aircraft of FIG. 1A.

As shown in FIGS. 1A-1B, an aircraft includes an aircraft body 101, which can include one or more bays 103 beneath a center wing box. The bay 103 can contain and/or support one or more components of the aircraft 101. For example, in some configurations, the aircraft can include environmental control systems (ECS) and/or on-board inerting gas generation systems (OBIGGS) within the bay 103. As shown in FIG. 1B, the bay 103 includes bay doors 105 that enable installation and access to one or more components (e.g., OBIGGS, ECS, etc.). During operation of environmental control systems and/or fuel inerting systems of the aircraft, air that is external to the aircraft can flow into one or more ram air inlets 107. The outside air may then be directed to various system components (e.g., environmental conditioning system (ECS) heat exchangers) within the aircraft. Some air may be exhausted through one or more ram air exhaust outlets 109.

Also shown in FIG. 1A, the aircraft includes one or more engines 111. The engines 111 are typically mounted on the wings 112 of the aircraft and are connected to fuel tanks (not shown) in the wings, but may be located at other locations depending on the specific aircraft configuration. In some aircraft configurations, air can be bled from the engines 111 and supplied to OBIGGS, ECS, and/or other systems through one or more conduits or ducts 113. It is noted here that the conduits or ducts 113 are schematically depicted as straight lines, but can extend curvilinearly, as will be appreciated by those of skill in the art. Bleed air from a compressor section of a gas turbine engine can be at a high temperature (e.g., 180° F. to 600° F.), and it is important to detect any leaks of aircraft bleed air or any high-temperature fluid as may be encountered in non-aircraft applications. Accordingly, in some embodiments, the thermal sensors described herein can be deployed as a linearly-extending (including curvilinear or straight linear) sensor adjacent to a bleed air conduit or other conduit for high-temperature fluid.

Figure 2:
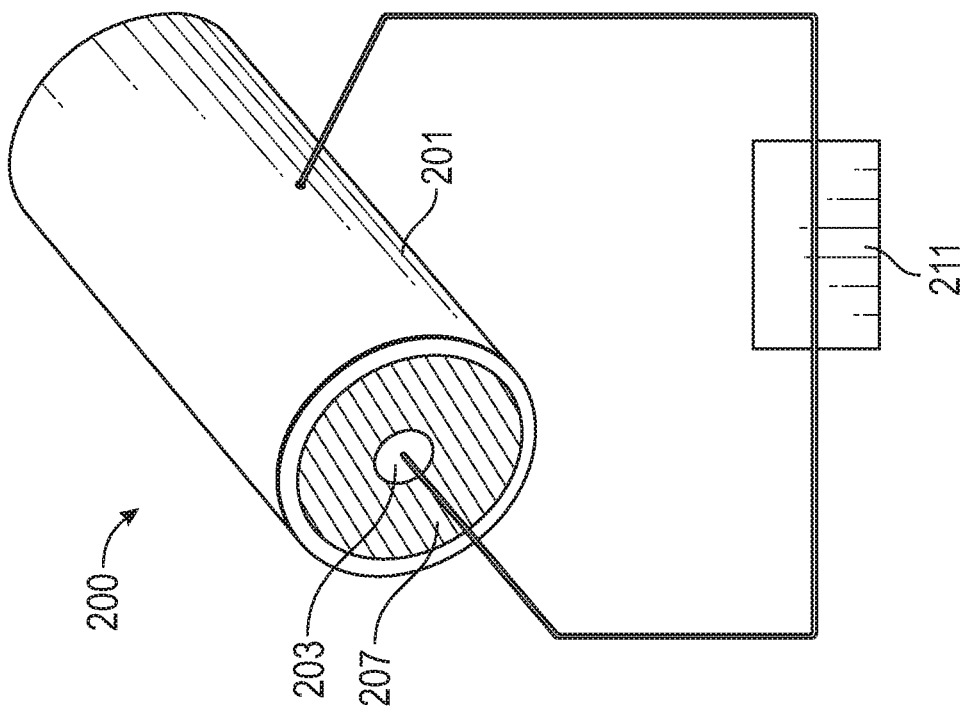
FIG. 2 is a schematic illustration of a perspective view of an example embodiment of a thermal sensor.

With reference now to FIG. 2, there is schematically shown an example of a thermal sensor 200. As shown in FIG. 2, in at least one aspect of this disclosure, a thermal sensor 200 includes an electrode 201 and an electrode 203. As shown, one or both of the electrodes 201, 203 can be cylindrical electrodes and/or coaxial electrodes, with electrode 201 positioned outer with respect to an inner position of electrode 203. However, other configurations can be used, and it is contemplated that the electrodes can be manufactured to any other suitable shape and arrangement. For example, a rectangular cross-section profile with flat electrodes can be used, as disclosed in U.S. Pat. No. 9,933,316, the disclosure of which is incorporated herein by reference in its entirety. The electrodes 201 and 203 can be made of various electrode materials, including but not limited to aluminum, Inconel 625, or other materials suitable for use as electrodes. The electrodes 201, 203 can be of the same material or can include different materials. In some aspects, the electrodes 201, 203 can include different materials. For example, the electrode 201 can include Inconel 625 and the electrode 203 can include a nichrome alloy.

As further shown in FIG. 2, a composition 207 is located between the electrode 201 and the electrode 203. As mentioned above, the composition 207 comprises solid particles that comprise a state-changing material that transitions at a threshold temperature between solid and liquid states having different electrical conductivities. Examples of state-changing materials include, but are not limited to, a salt, a salt mixture, or an electrically-conducting polymer. In some aspects, the state-changing material can include a chemical mixture of nitrate salts having lithium, sodium and potassium cations and a lesser amount of nitrite salt that may contain one or more cations that include lithium, sodium and potassium. The desired amount of nitrite species can range from about 1% by weight to about 15% by weight.

In some aspects, the state-changing material can include a salt mixture. A non-limiting example embodiment of a salt mixture is $LiNO_3:NaNO_3:KNO_3:NaNO_2$. Other salts that can be used, alone or in mixtures include, but are not limited to, $CsNO_3$, $Ca(NO_3)_2$, $NaCl$, $ZnSO_4$, $KI$, $SnCl_2$, $NH_4Cl$, and/or $MgCl_2$. In some aspects, the composition of the state-changing material 207 can be a eutectic salt mixture, which can promote control and precision of the phase change temperature. In some aspects, the state-changing material can provide to provide a state change temperature at a desired threshold temperature, such as a temperature in a range of 94.5-104.5° C. (e.g., a phase change temperature of about 99.5° C. can be achieved for the above-referenced mixture of $LiNO_3:NaNO_3:KNO_3:NaNO_2$).

The solid particles comprising the state-changing material in the composition 207 can be produced by various techniques, including but not limited to controlled precipitation of particles from a solution, milling, or combinations of such techniques. Particle sizes can vary in a range from above zero to an upper limit of the available space between the electrodes 201 and 203, with 20-200 µm being typical. In some aspects, the composition can include particles with a uniform composition. For example, in the case of a salt mixture such as a eutectic salt mixture, each particle can include the same mixture of salts such as the above-referenced mixture of $LiNO_3:NaNO_3:KNO_3:NaNO_2$. In other aspects, the particles can have different compositions. For example, in the case of a salt mixture such as a eutectic salt mixture, the composition can include particles composed of each individual salt (e.g., in the case of the above-referenced mixture, the composition can include $LiNO_3$ particles, $NaNO_3$ particles, $KNO_3$ particles, and $NaNO_2$ particles), which can provide technical benefits such as promoting ease of preparation of the mixture.

In some aspects, the composition 207 can include a binder. In some aspects, the binder can provide a technical effect of promoting cohesion of the composition 207 during fabrication as will be described in further detail below. Examples of binders include but are not limited to a grease (e.g., a composition of a petroleum oil and filler particles such as a salt (e.g. a lithium salt) of a fatty acid), a polymer, a glue, a wax, a cement, or a ceramic The binder should be selected so that it can withstand temperatures to which it will be exposed under normal conditions (including exposure to hot fluid leaks) without decomposition, and so that does not interfere with the electrical properties of the solid particles of state-changing material. A binder is not essential. For example, loose particles can be poured into a space between the electrodes 201 and 203, or cohesion between particles could be provided by exposing the particles to moisture before application to one of the electrodes followed by drying under vacuum after application to the electrode, although utilization of a binder may be more efficient than such alternatives. Large quantities of binder are not needed, and in some aspects can even be detrimental if the quantity of binder is large enough to interfere with the composition's ability to form an electrical connection between the electrodes 201 and 203 in its liquid state. In some aspects, the composition 207 can include a binder in an amount of at least 15 mass % and less than or equal to 30 mass %, based on the total mass of the composition.

In some aspects, the thermal sensor can include one or more support components between the electrode 201 and the electrode 203. For example, in some aspects, the thermal sensor can include a support layer as disclosed in U.S. Pat.

Figure 3:
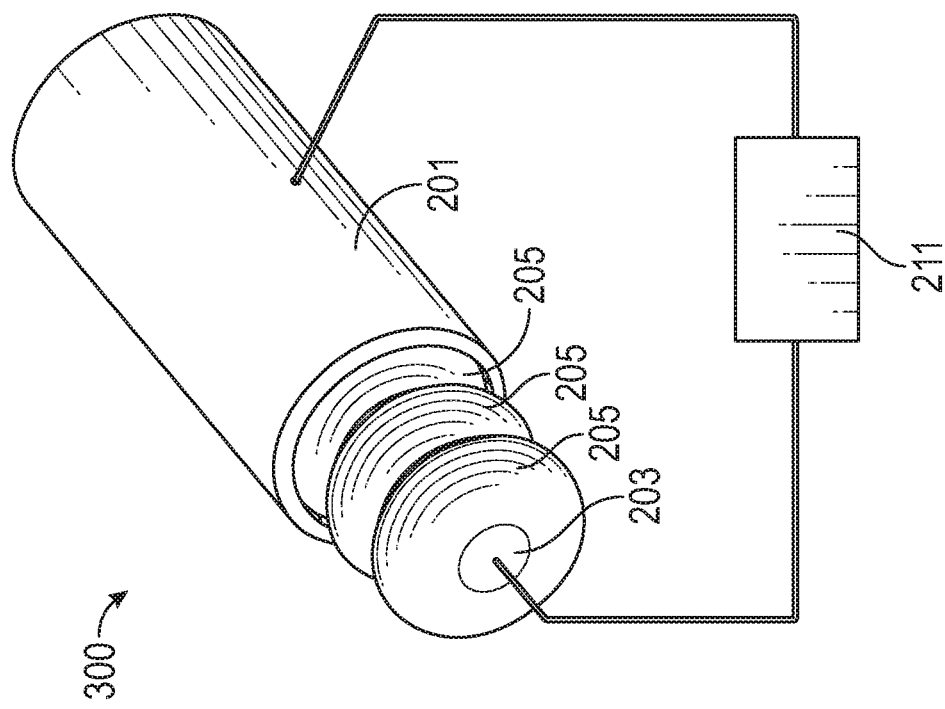
FIG. 3 is a schematic illustration of a perspective view of another example embodiment of a thermal sensor.
Figure 4:
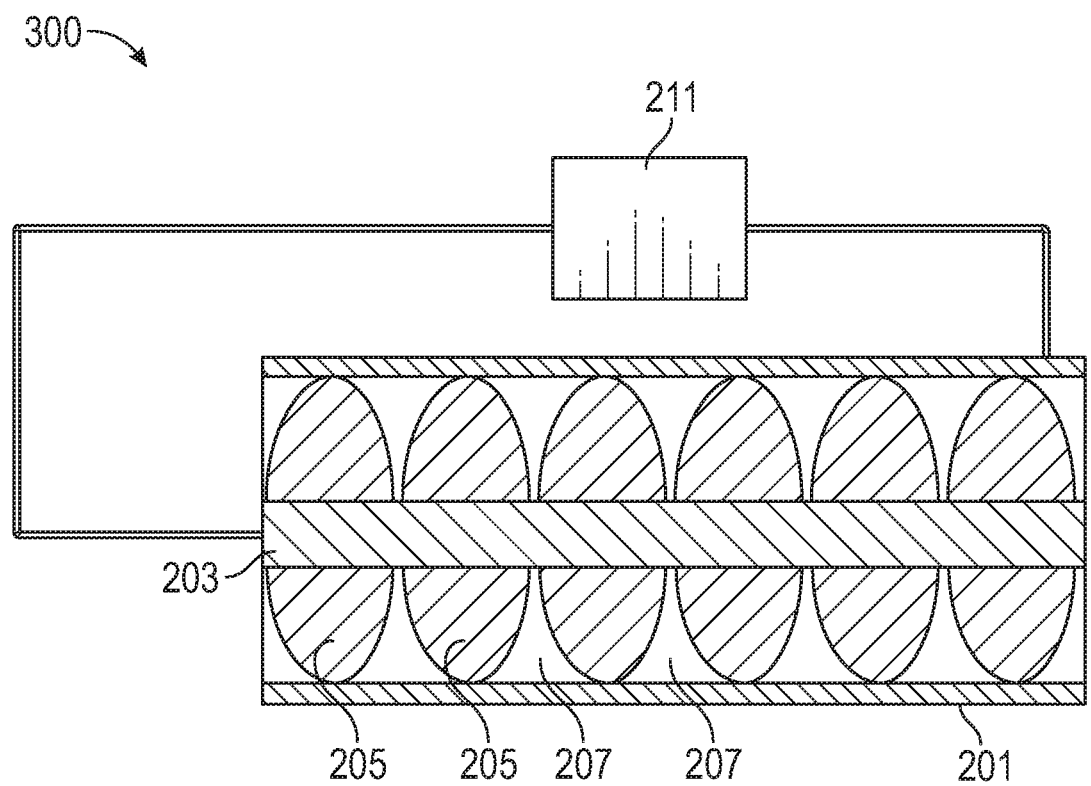
FIG. 4 is a schematic illustration of a cross-section view of an example embodiment of a thermal sensor.

No. 10,101,218, the disclosure of which is incorporated herein by reference in its entirety, or as disclosed in the above-referenced U.S. Pat. No. 9,933,316. In some aspects, the thermal sensor can include one or more electrically non-conductive beads between the electrode 201 and the electrode 203, as disclosed in U.S. Pat. No. 9,518,872, the disclosure of which is incorporated herein by reference in its entirety. A non-limiting example embodiment of a thermal sensor 300 with beads 205 between the electrodes 201 and 203 is schematically shown in FIGS. 3-4, which use numbering of components from FIG. 2 to describe like components without repetition of the components' explicit description. The beads 205 can have any suitable shape, and a single sensor 300 can include multiple shapes of beads 205. As shown in FIGS. 3-4, the beads 205 can be ovular. In another embodiment shown in FIG. 5 (which uses numbering of components from FIG. 2-4 to describe like components without repetition of the components' explicit description), a sensor 400 can include beads 305 that have a chamfered shape. Other suitable shapes (e.g., toroidal, spherical) can also be used.

In some aspects, the beads 205/305 can include a granular ceramic, glass or a granular high temperature polymer. The form of the granular ceramic or polymer may exist as a mesh, fibers, or membrane structure. A suitable polymeric material includes high temperature polytetrafluoroethylene (PTFE), and suitable ceramic materials include non-conducting metal oxides such as alumina, and glass. In some aspects, the beads 205/305 can further include one of a porous ceramic or a high temperature polymer with induced porosity, such as a polymer foam. In embodiments using porous ceramic, the porous ceramic can include glass fiber or any other suitable porous ceramic in membrane form. In embodiments using a high temperature polymer, the high temperature polymer can include polytetrafluoroethylene (PTFE), polyetheretherketone (PEEK), polyetherimide (PEI), polyphenylsulfone (PPSU), and/or polysulfone (PSU), or other high temperature polymer.

Figure 5:
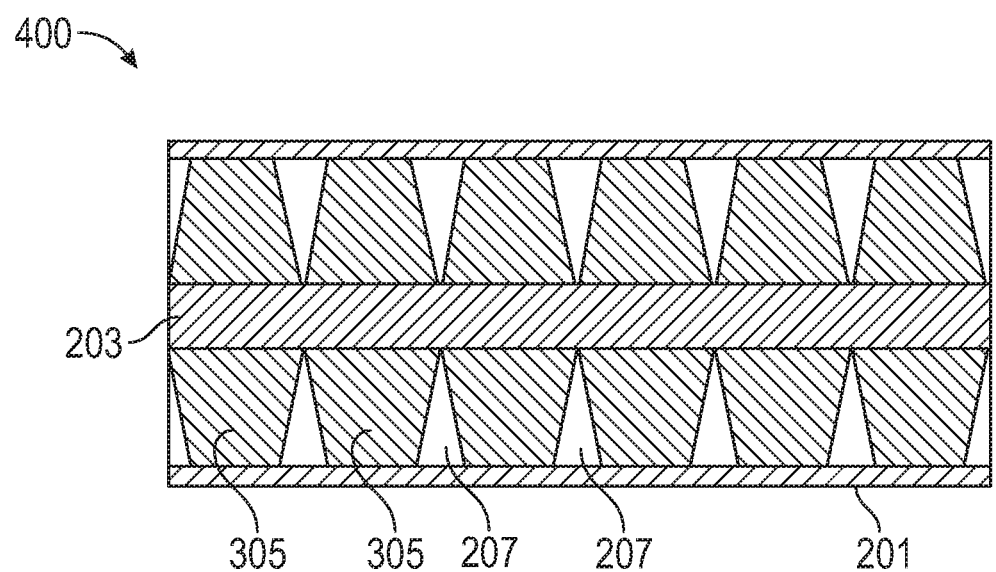
FIG. 5 is another schematic illustration of a cross-section view of another example embodiment of a thermal sensor.

As further shown in FIGS. 3-5, the beads 205/305 can be arranged such that cavities are defined between the beads. The composition 207 is disposed in these cavities, as shown in FIGS. 4-5. In some aspects, the composition 207 (and the beads 205/305 if present) can be sealed in between the electrode 201 and the electrode 203 by a sealant at one or both ends of sensor. Examples of sealeants include perfluoro-elastomers, or other suitable high temperature sealant that has a melting/decomposition temperature above that of the state change material.

As further shown in FIGS. 2-4, the sensor 200/300 can be electrically connected to a signal processing system 211 configured to determine an impedance, resistance, voltage, current, or other electrical characteristic. Although not shown in FIG. 5, the sensor 400 can also be similarly connected. The signal processing system 211 can include any suitable circuitry hardware, software, and/or the like for receiving and/or processing electrical signals. Examples of signal processing systems suitable for use as the signal processing system 211 are further disclosed in U.S. Pat. No. 9,976,925, the disclosure of which is incorporated herein by reference in its entirety.

During operation, the sensor 200/300/400 can be used to determine temperature (e.g., through impedance measurements or other suitable electrical analysis) and/or that a temperature threshold has been exceeded. Below a threshold temperature, the beads 205/305 and the composition 207 with solid particles act as an electrical insulator between the electrodes. When the threshold temperature is reached or exceeded, the state change material in the composition 207 melts and closes the circuit between the electrode 201 and the electrode 203 by melting within the bead cavities and/or diffusing through the beads 205/305 themselves if the beads are porous. The signal processing system 211 can determine when this occurs and can signal a system (e.g., an on-board computer) or provide other suitable indicator to indicate that a temperature where the sensor is located has exceeded a threshold temperature.

The sensors disclosed herein can be mounted to (e.g., via high temperature bonding) or positioned in an aircraft system (e.g. a duct) or other system near a heat source, e.g., near a hot air conduit wall (e.g., a bleed air conduit) from which the sensor can detect a leak of hot fluid. The disclosed sensors can provide technical effects of geometric flexibility to allow for placement along both curvilinear-extending and straightline-extending portions of such conduits, while maintaining positional integrity of the electrodes along the linearly-extending sensor.

In at least one aspect of this disclosure, a method for manufacturing a thermal sensor includes disposing a composition between the first and second electrodes, said composition comprising solid particles that comprise a state-changing material that transitions at a threshold temperature between solid and liquid states having different electrical conductivities. Various techniques can be used to dispose the composition 207 between the electrodes. For example, in some aspects, loose particles of the state-changing material can be poured or otherwise deposited into a space between electrodes such as the annular space between the electrodes of a sensor such as the electrodes 201 and 203 of the sensor 200 shown in FIG. 2. In some aspects, a composition comprising the solid particles of state-changing material and a binder can be applied to an electrode such as the electrode 203 of FIGS. 2-5, and the electrode with the composition thereon can be disposed adjacent to another electrode (e.g., by inserting the electrode 203 with the composition thereon into the space inside of the electrode 201).

Application of the composition 207 to an electrode such as electrode 203 of FIGS. 2-5 can be carried out by various techniques such as extrusion under pressure to direct the composition onto the electrode. The beads 205/305 can promote retention of the composition in place during application and/or insertion, and can also promote proper alignment of the electrodes 201/203, while maintaining electrical insulation between the first and second electrodes prior to activation of the state-changing material. In some embodiments, the composition can be subjected to a vacuum (defined herein as any pressure below atmospheric and in some aspects a pressure below 10 psia), which can promote removal of moisture from hygroscopic materials such as salts used in a eutectic salt mixture. The vacuum can be applied at various steps of the manufacturing process. For example, in some embodiments, a vacuum can be applied after assembly of the electrodes 201 and 203 with the composition 207 between the electrodes, before sealing the ends of the assembly. Alternatively, or in addition, a vacuum can be applied during application of the composition 207 to provide a pressure differential for extrusion of the composition 207 (i.e., pultrusion).

Compared to alternative techniques involving assembly of the sensor with the state-changing material in a liquid form, fabrication with the composition comprising particles of the state-changing material can be accomplished more rapidly and/or at lower cost. Other techniques can be used as well, such as forming an electrode 201 onto an electrode 203 with the composition 207 applied thereto. In some aspects, disposing the beads 205/305 on the electrode 203 can include sliding the beads 205/305 onto the electrode 203. In other embodiments, disposing the plurality of beads 205/305 on the electrode 203 can include forming the beads 205/305 around the electrode 203.

As used herein, the term "about" is intended to include the degree of error associated with measurement of the particular quantity based upon the equipment available at the time of filing the application.

The terminology used herein is for the purpose of describing particular aspects only and is not intended to be limiting of the present disclosure. As used herein, the singular forms "a", "an", "the", or "any" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or aspects, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all aspects falling within the scope of the claims.

What is claimed is:

1. A method of making a thermal sensor, comprising:
   providing a first electrode;
   disposing a plurality of electrically non-conductive beads on the first electrode;
   applying a composition to the beads said composition comprising a binder and solid particles in a solid form that comprise a state-changing material that transitions at a threshold temperature between solid and liquid states having different electrical conductivities;
   after applying, surrounding the beads, the composition and the first electrode with a second electrode.

2. The method of claim 1, further comprising applying a vacuum to the composition during application of the composition to the beads.

3. The method of claim 1, wherein the state-changing material comprises a eutectic salt mixture.

4. A method of making a thermal sensor, comprising:
   providing a first axially-extending electrode;
   disposing a plurality of electrically non-conductive beads along the first axially-extending electrode, arranged with gaps between the electrically non-conductive beads;
   applying a composition to the first electrode in the gaps between the electrically non-conductive beads, said composition comprising a binder and solid particles that comprise a state-changing material that transitions at a threshold temperature between solid and liquid states having different electrical conductivities; and
   disposing a coaxially-extending second electrode around the first electrode, beads, and composition.

5. The method of claim 4, further comprising forming said composition by blending a binder and a plurality of particles of different salts in amounts to form a eutectic mixture.

* * * * *